(12) United States Patent
Alonichau et al.

(10) Patent No.: US 8,996,994 B2
(45) Date of Patent: Mar. 31, 2015

(54) MULTI-LINGUAL WORD HYPHENATION USING INDUCTIVE MACHINE LEARNING ON TRAINING DATA

(75) Inventors: Siarhei Alonichau, Redmond, WA (US); Ravi Shahani, Redmond, WA (US); Kevin Powell, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1946 days.

(21) Appl. No.: 12/015,489

(22) Filed: Jan. 16, 2008

(65) Prior Publication Data

US 2009/0182550 A1 Jul. 16, 2009

(51) Int. Cl.
*G06F 17/20* (2006.01)
*G06F 17/26* (2006.01)

(52) U.S. Cl.
CPC ...................... *G06F 17/26* (2013.01)
USPC .......... 715/258; 704/1; 704/8; 704/9; 704/10; 715/255; 715/256

(58) Field of Classification Search
CPC ....... G06F 17/20; G06F 17/21; G06F 17/211; G06F 17/24; G06F 17/26; G06F 17/27
USPC ..................... 704/8, 9, 10; 715/255, 256, 258
See application file for complete search history.

(56) References Cited

U.S. PATENT DOCUMENTS

| | | | |
|---|---|---|---|
| 4,092,729 A | | 5/1978 | Rosenbaum et al. |
| 4,139,902 A | * | 2/1979 | Bodin ........................... 715/256 |
| 4,456,969 A | | 6/1984 | Herzik et al. |
| 4,574,363 A | * | 3/1986 | Carlgren et al. .............. 715/258 |
| 4,783,811 A | | 11/1988 | Fisher et al. |
| 4,995,738 A | | 2/1991 | Shibaoka |
| 4,995,739 A | * | 2/1991 | Hirata et al. ..................... 400/63 |
| 5,065,318 A | | 11/1991 | Kugimiya et al. |
| 5,113,342 A | * | 5/1992 | Zamora ............................ 704/9 |

(Continued)

OTHER PUBLICATIONS

Gosse Bouma. Finite state methods for hyphenation. Journal of Natural Language Engineering, Special Issue on Finite State Methods in NLP, 2003.*

(Continued)

*Primary Examiner* — Paras D Shah
(74) *Attorney, Agent, or Firm* — Jessica Meyers; Jim Ross; Micky Minhas

(57) ABSTRACT

Tools and techniques are described for providing multi-lingual word hyphenation using inductive machine learning on training data. Methods provided by these techniques may receive training data that includes hyphenated words, and may inductively generate hyphenation patterns that represent substrings of these words. The hyphenation patterns may include the substrings and hyphenation codes associated with characters occurring in the substrings. The methods may receive induction parameters applicable to generating the hyphenation patterns, and may store the hyphenation patterns into a language-specific lexicon file. These methods may also receive requests to hyphenate input words that occur in a human language, and may evaluate how to process the request based on the language. The methods may search for hyphenation patterns occurring in the input words, with the hyphenation patterns being stored in the lexicon file. Finally, the methods may respond to the request, indicating whether the hyphenation patterns occurred in the input words.

19 Claims, 9 Drawing Sheets

(56) References Cited

U.S. PATENT DOCUMENTS

| | | | |
|---|---|---|---|
| 5,225,981 A | | 7/1993 | Yokogawa |
| 5,295,069 A | * | 3/1994 | Hersey et al. ............... 715/258 |
| 5,319,746 A | | 6/1994 | Toshiyuki |
| 5,560,037 A | * | 9/1996 | Kaplan ....................... 715/201 |
| 5,737,621 A | | 4/1998 | Kaplan et al. |
| 5,890,103 A | * | 3/1999 | Carus ............................. 704/9 |
| 6,901,399 B1 | * | 5/2005 | Corston et al. ..................... 1/1 |
| 7,401,290 B2 | * | 7/2008 | Wormely .................... 715/247 |

OTHER PUBLICATIONS

Kodydek, G.; Schönhacker, M.: Si3Trenn and Si3Silb: Using the SiSiSi Word Analysis System for Pre-Hyphenation and Syllable Counting in German Documents, Proceedings of the 6th Internat. Conference on Text, Speech and Dialogue (TSD 2003), Springer-Verlag, 2003.*

Sieber, Gregor. "Automatic Learning Approaches to Morphology-a survey and a Sample Implementation for Hyphenation." University of Tubingen. Bachelor of Arts Thesis. Aug. 2005.*

Nunn, Anneke. "Automatic Hyphenation of Dutch Words based on Linguistic Rules." (1999).*

Zlatuska, "Surviving in a Multi Lingual World with Multiple Font Encodings", Masaryk University, 1994, pp. 1001-1008.

Nemeth et al., "Multilingual Statistical Text Analysis, Zipf's Law and Hungarian Speech Generation", Budapest University of Technology and Economics, 2002, pp. 16.

Smrz et al., "Word Hy-phen-a-tion by Neural Networks", 1996, FI MU, pp. 12.

Bernhard, "Multilingual Term Extraction from Domain-specific Corpora Using Morphological Structure", Conference Companion of the 11th Conference of the European Chapter of the Association for Computational Linguistics (EACL-06), 2006, pp. 171-174.

Liang, Franklin, "Word Hy-phen-a-tion by Com-put-er," Aug. 1983, Thesis, Department of Computer Science, Stanford University, 62 pages.

* cited by examiner

MULTI-LINGUAL WORD HYPHENATION USING INDUCTIVE MACHINE LEARNING ON TRAINING DATA

BACKGROUND

Several techniques currently exist for automatically hyphenating words that appear within documents. For example, dictionary-based approaches compile and maintain extensive vocabularies of words, along with permitted hyphenations for those words. However, maintaining these dictionaries is expensive in terms of time and effort, whether augmented with manual or statistical techniques. Further, these dictionaries may be error-prone. Additionally, storage space constraints may dictate that these dictionaries contain only the most commonly used words within a given language. Smaller dictionaries are more likely to omit obscure "out-of-vocabulary" (OOV) words that fall within a long statistical "tail" of words appearing in different human languages, but expanded dictionaries become more expensive to build and maintain, and consume additional storage.

SUMMARY

Tools and techniques are described for providing multi-lingual word hyphenation using inductive machine learning on training data. Methods provided by these techniques may receive training data that includes hyphenated words, and may inductively generate hyphenation patterns that represent substrings of these words. The hyphenation patterns may include the substrings and hyphenation codes associated with characters occurring in the substrings. The methods may receive induction parameters applicable to generating the hyphenation patterns, and may store the hyphenation patterns into a language-specific lexicon file. These methods may also receive requests to hyphenate input words that occur in a human language, and may evaluate how to process the requests based on the language. The methods may search for hyphenation patterns occurring in the input words, with the hyphenation patterns being stored in the lexicon file. Finally, the methods may respond to the requests by indicating whether the hyphenation patterns occurred in the input words.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
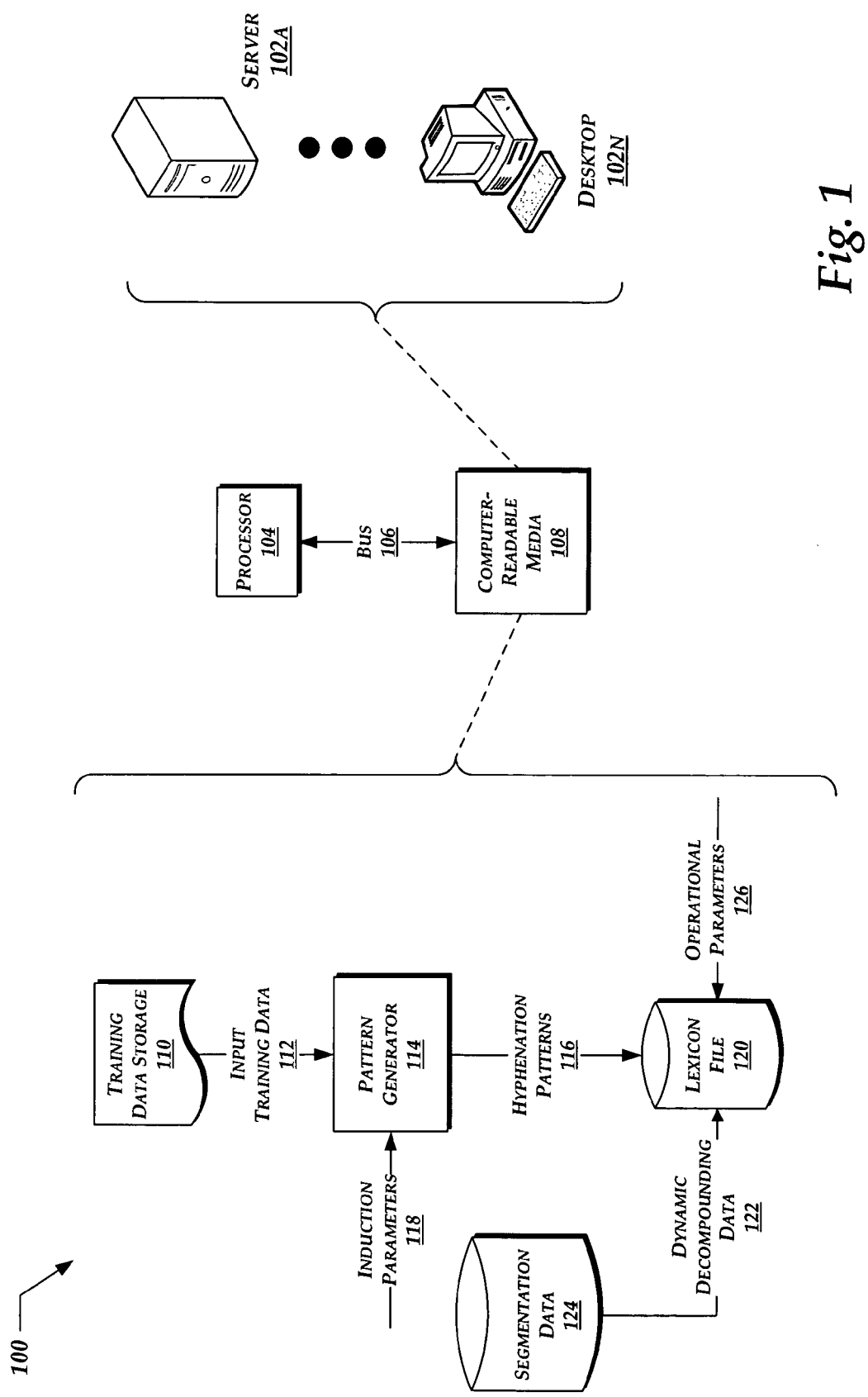
FIG. 1 is a block diagram illustrating systems or operating environments in which server systems may enable multi-lingual word hyphenation using inductive machine learning on training data.

The following detailed description is directed to technologies for multi-lingual word hyphenation using inductive machine learning on training data. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for multi-client collaboration to access and update structured data elements will be described.

FIG. 1 illustrates systems or operating environments, denoted generally at 100, that enable multi-lingual word hyphenation using inductive machine learning on training data. These systems 100 may include one or more server systems 102, with FIG. 1 providing two examples of servers at 102*a* and 102*n* (collectively, servers 102). However, implementations of the description herein may include any number of servers.

The graphical elements used in FIG. 1 to depict the server systems are chosen only to facilitate illustration, and not to limit possible implementations of the description herein. More particularly, FIG. 1 shows examples in which the server system 102*a* is a centralized computing system, possibly shared by more than one client system. The server system 102*n* represents a desktop system. However, the description herein also contemplates other forms of server systems, including but not limited to, those shown in FIG. 1.

Turning to the servers 102 in more detail, the servers may include one or more processors 104, which may have a particular type or architecture, chosen as appropriate for particular implementations. The processors 104 may couple to one or more bus systems 106 chosen for compatibility with the processors 104.

The servers 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more modules of instructions that, when loaded into the processor 104 and executed, cause the server 102 to perform various techniques for providing multi-lingual word hyphenation services using inductive machine learning on training data. As detailed throughout this description, these servers 102 may provide the hyphenation services using the components and data structures now described in connection with FIG. 1.

The computer-readable media 108 may include one or more storage elements 110 that contain training data (TD or D) 112. This training data provides a set of correctly hyphenated words that are used as a basis for the hyphenation services described herein. The training data may provide symbolic representations of hyphenation codes that describe the type of actions to be performed after a given input character occurs within a word. These actions may also insert or remove additional characters as described further in the examples below. Without limiting possible implementations, the following table provides examples of training data, as shown below:

. . .
Mehl[=]sac[Xk=]ke
Mehl[=]säc[Xk=]ken
Mehl[=]zuc[Xk=]ker
. . .
Stof[f=]far[=]be
Stof[f=]fül[=]le
Stof[f=]fül[=]len
. . .
Disk-[X=]Joc[Xk=]key
Hew[=]lett-[X=]Pac[Xk=]kard
Pu[=]ruc[Xk=]ker-[X=]Seu[=]nig
. . .

| Hyphenation code | Representation | Description |
| --- | --- | --- |
| 0 | | No hyphenation to be done |
| 1 | [=] | Insert hyphen (without modifying word) |
| 2 | [X=] | Delete the letter before the hyphen |
| 3 | [c=] | Add a specified letter (e.g., "c") before hyphen |
| 4 | [Xc=] | Change letter before hyphen to some specified letter (e.g., "c") |
| 5 | [=Xc] | Change letter after hyphen to a specified (e.g., "c") |
| 6 | [X=Xc] | Delete letter before hyphen, and change letter after hyphen to a specified letter (e.g., "c") |
| 7 | [?] | "don't care" scenario, in which neither the pattern nor the training data specifies hyphenation for this letter |

These example actions (other than the "don't care", the no-hyphen, and the simple hyphen cases as denoted by hyphenation codes 0, 1, and 7) may address such phenomenon as modifying hyphenation within words, which may occur in, for example, Germanic languages. However, other languages, for example English, may benefit from hyphenation actions beyond either hyphenating a given word or not hyphenating that word. For example, the [X=] action (denoted by hyphenation code 2) may properly treat hard hyphen characters occurring within the word. It is understood, however, that this description is not limited to the given set of actions or hyphenation-codes provided herein.

A pattern generation module 114 may represent one or more modules of software instructions that, as described further below, generate patterns that provide a basis for inducing or inferring when and how to hyphenate particular words. FIG. 1 denotes these hyphenation patterns generally at 116. The pattern generation module 114 may receive as input one or more induction parameters 118. Without limiting possible implementations, the following examples of induction parameters 118 are provided:

1. minimal pattern length, MinLen;
2. maximal pattern length, MaxLen;
3. minimal pattern precision, P;
4. minimal pattern frequency, f;
5. exclude patterns that only suppress hyphenation;
6. generate patterns with "don't care" symbols; and
7. if #6 is used then maximum left context size.

For the purposes of this discussion, s represents a substring of a word in the training data D, and c represents a corresponding sequence of the hyphenation codes of this word in the training data D. The notation $f_{<s,c>}$ represents a sum of frequencies of all words from D that include this substring s, with the same corresponding sequence of hyphenation codes c, ignoring differences attributable to the "don't care" codes in the sequence c. The term $F_s$ represents a sum of frequencies of all words $F_s$ having substring s. MinLen represents the minimum pattern length for substrings, and MaxLen represents the maximum pattern length for the substrings.

Given the above notation, the term "hyphenation pattern" as used herein refers to a pair <s, c>, where s is a minimum length substring of a word from the training data D, and c is a corresponding sequence of the hyphenation codes, satisfying the constraints:

1. $f_{<s,c>}$ divided by $F_s$ assumed to be greater or equal to P,
2. $f_{<s,c>}$ assumed to be greater or equal to f,
3. length of s assumed to be less or equal to MaxLen,
4. length of s assumed to be greater or equal to MinLen.

The pattern generator 114 may store the hyphenation patterns 116 into a lexicon file 120, which may be implemented as a binary file. As discussed further below, the various components and data structures shown in FIG. 1 may be viewed as providing a compile-time environment that generates the lexicon file 120. In addition, clients may use the lexicon file in a run-time environment to allow hyphenation of particular words upon request. The lexicon file 120 may be language-specific, with different instances of the lexicon file being provided for different languages being hyphenated.

In languages that utilize compound word structures, the lexicon file may include dynamic decompounding data, as denoted in FIG. 1 at 122. Segmentation data related to decompounding compound words may be stored in the data store designated at 124.

Lexicon file 120 may incorporate one or more operational parameters, denoted generally at 126. Examples of operational parameters include, but are not limited to, the following:

parameters indicating whether to ignore the case of input words;

parameters specifying, when hyphenating a given word between two consecutive lines, a minimum prefix of the word that concludes the first consecutive line, and/or a minimum length suffix of the word that begins the second consecutive line;

parameters specifying whether and/or how to call a dynamic decompounder; and/or parameters specifying any additional character normalization map, which may be similar to, but not limited to, case normalization.

Having described the compile-time systems shown in FIG. 1, the discussion now proceeds to a description of run-time systems. This description is now presented with FIG. 2.

Figure 2:
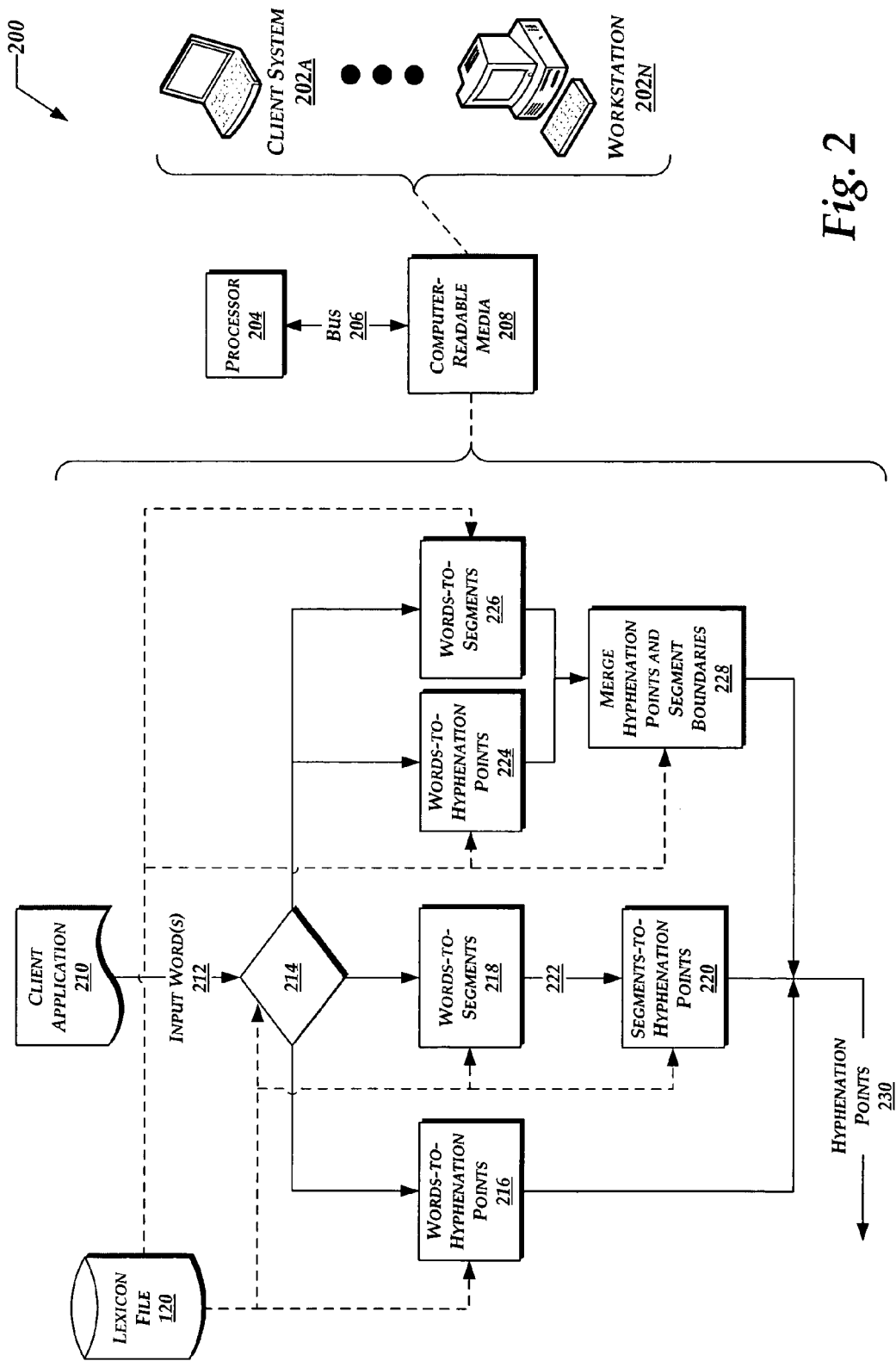
FIG. 2 is a block diagram illustrating operating environments or systems in which client systems may request multi-lingual word hyphenation using inductive machine learning in a run-time environment.

FIG. 2 illustrates operating environments or systems, denoted generally at 200, for performing multi-lingual word hyphenation using inductive machine learning in a run-time environment. For ease of reference, and not limitation, FIG. 2 may carry forward some reference numbers from previous drawings to refer to similar items. For example, FIG. 2 carries forward the lexicon file 120 from FIG. 1.

FIG. 2 provides two examples of client systems, as denoted at 202a and 202n (collectively, client systems 202). The graphical elements used in FIG. 2 to depict the client systems are chosen only to facilitate illustration, and not to limit possible implementations of the description herein. More particularly, FIG. 2 shows examples in which the client system 202a is a portable computing system, whether characterized as a laptop, notebook, or other mobile system. The client system 202n represents a stationary or desktop system. However, the description herein also contemplates other forms of client systems, including but not limited to wireless personal digital assistants, smartphones, or the like.

Turning to the client systems 202 in more detail, the client systems may include one or more processors 204. These processors may be chosen as appropriate for the client systems, and may or may not have the same type or architecture as the processors 104 within the servers. The processors 204 may couple to one or more bus systems 206 chosen for compatibility with the processors 204, and thus may or may not be the same type or architecture as the bus systems 106 within the servers.

The client systems may include one or more instances of computer-readable storage media 208, which are coupled to the bus systems 206. The bus systems 206 may enable the processors 204 to read code and/or data to/from the computer-readable storage media 208. The general descriptions of the storage media 108 apply generally to the storage media 208, and thus are not repeated here.

The storage media 208 may include one or more modules of instructions that, when loaded into the processor 122 and executed, cause the client systems 202 to request hyphenation services from server systems, such as the server systems 102 shown in FIG. 1. For example, the computer readable media 208 may include one or more client applications 210 that may request hyphenation services for one or more input words 212. Depending on certain factors, such as the human language used in a given implementation context, a decision block 214 may select among several hyphenation options, as now described. Other decision factors represented by block 214 may include, but are not limited to, considerations of how well the hyphenation services are processing the input text using only the hyphenation patterns included in the training data. If the hyphenation services are not meeting applicable metrics when using only the hyphenation patterns, the hyphenation services may execute the decompounder either serially or in parallel with the hyphenation patterns. Other factors may include the quality and quantity of the training data.

Block 216 represents applying the hyphenation patterns to the input words 212, to identify hyphenation points within the input words. For example, block 216 may be appropriate in the English language, or other languages that do not employ compound word structures. As described further herein, hyphenation points may specify where it is permissible to hyphenate within an input word, and may also specify where it is not permissible to hyphenate within the input word.

Block 218 represents decompounding in input compound word into two or more segments. In turn, block 220 represents applying the hyphenation patterns respectively to the various segments resulting from block 218, with FIG. 2 denoting the segments at 222. In the examples shown, blocks 218 and 220 perform their processing sequentially.

In another example shown in FIG. 2 for processing input compound words, block 224 represents applying the hyphenation patterns to the input compound words 212, to identify hyphenation points within the input compound words. In addition, block 226 represents decompounding the input compound word into two or more segments, similarly to block 218. As shown, blocks 224 and 226 operate in parallel on the input compound words 212, with block 224 generating a set of hyphenation points and block 226 generating a set of hyphenation points within segments of the compound words. In turn, block 228 represents receiving the results of blocks 224 and 226, and merging the hyphenation points resulting from block 224 with the segment boundaries resulting from block 226. Block 228 may include considering the boundaries of segments between the compound words when choosing hyphenation points, according to rules and preferences associated with particular human languages. For example, although blocks 218, 220, 224, and 226 may be performed with Germanic languages, particular combinations of these blocks may be chosen as appropriate for particular languages and particular sets of training data.

FIG. 2 generally denotes at 230 the hyphenation points resulting from any of the foregoing techniques. These hyphenation points 230 may indicate where it is appropriate to hyphenate the input words 212, according to the language-specific lexicon file 120. As indicated by the dashed arrows in FIG. 2, data from the lexicon file 120 serves as input to the decision block 214, as well as the processing blocks 216, 218, 220, 224, 226, and 228. More specifically, these dashed arrows represent data flows related to the different processing blocks consulting the lexicon file 120. In the examples shown, input words to be hyphenated may flow through the processing blocks (e.g., 214, 216, 218, 220, 224, 226, and/or 228). In turn, these different processing blocks may process the input words in response to operational parameters for the runtime environment (e.g., 126 as shown in FIG. 1), as represented by the dashed arrows from the lexicon file 120.

The dashed arrows in FIG. 2 may also represent compiled hyphenation patterns, segmentation data, or the like. In this manner, the lexicon file 120 may handle the operational parameters applicable to different human languages on behalf of the client application 210. For example, the lexicon file may provide the processing blocks 216 and 224 (i.e., "words to hyphenation points", or W2H blocks) with an automaton incorporating hyphenation patterns. In addition, the lexicon file may provide processing blocks 218 and 226 (i.e., "words to segments", or W2S blocks) with an automaton incorporating segment boundaries.

Having described the run-time systems and environments 200, the discussion now proceeds to a description of process flows for generating patterns. This description is now presented with FIG. 3.

Figure 3:
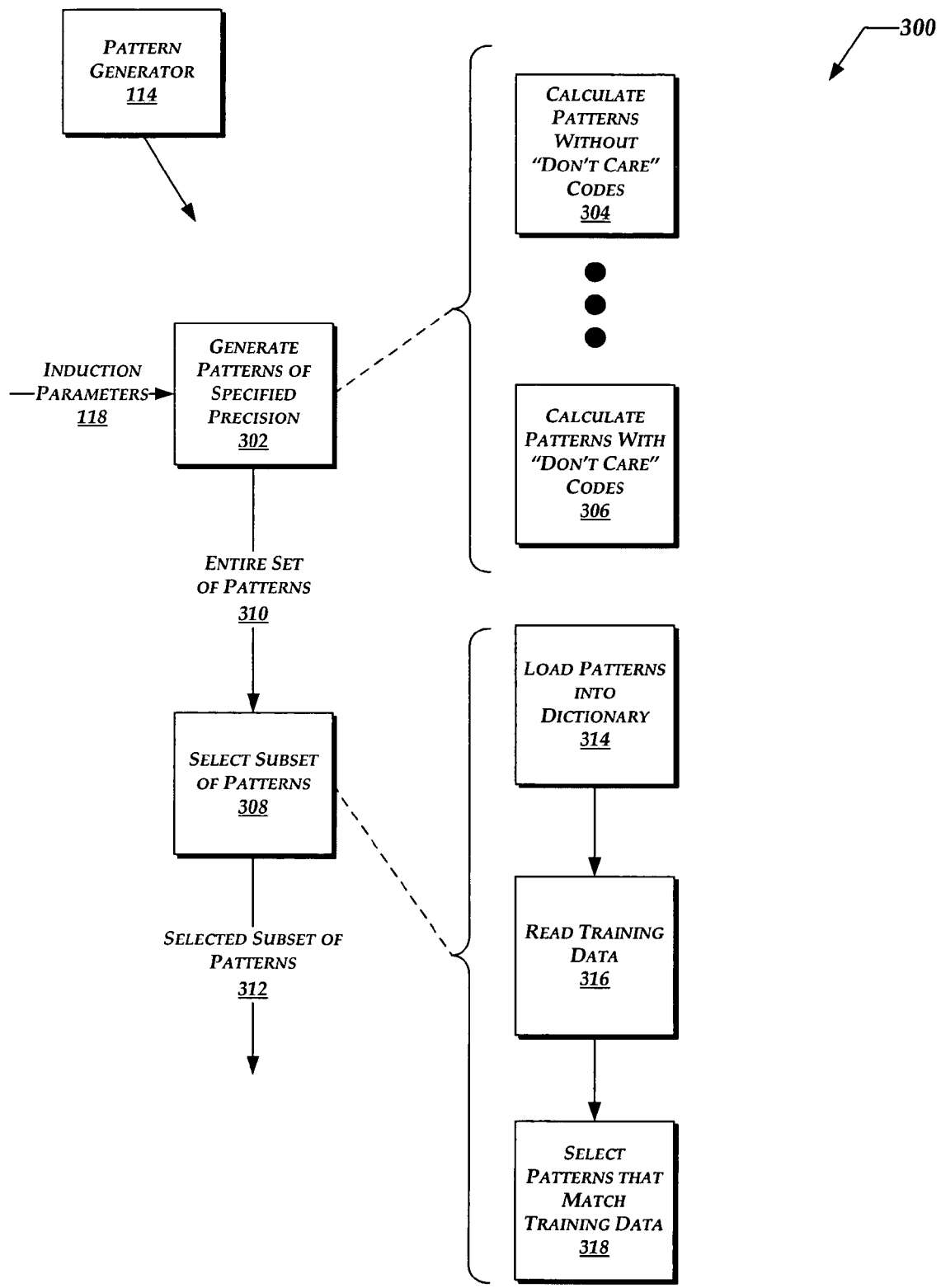
FIG. 3 is a flow diagram of processes for generating hyphenation patterns for use in connection with multi-lingual word hyphenation.

FIG. 3 illustrates process flows, denoted generally at 300, for generating patterns used in connection with hyphenating input words. For ease of reference, and not limitation, FIG. 3 may carry forward some reference numbers from previous drawings to refer to similar items. For example, FIG. 3 carries forward the pattern generator block 114 from FIG. 1, and elaborates further on the processing represented therein Block 302 represents generating patterns of specified precision, according to induction parameters carried forward at 118. Block 302 may include generating all possible patterns from the input training data, with these patterns meeting or exceeding the minimum precision specified in the induction parameters, and may include generating the maximum number of possible patterns given this precision. For input OOV words that are not in the training data, the level of precision specified for block 302 may define a lower bound on the accuracy with which the processes described herein may hyphenate such OOV words. More specifically, higher levels of precision in generating the hyphenation patterns may raise the lower bound on accuracy, thereby resulting in more input OOV words being hyphenated correctly.

As described previously, examples of induction parameters may include, but are not limited to, minimal pattern length, maximum pattern length, and minimal pattern precision, minimal pattern frequency. The induction parameters may also specify whether to exclude patterns that only suppress hyphenation, may specify whether to generate patterns with "don't care" symbols. If the induction parameters specified to generate patterns with "don't care" symbols, other parameters may also specify a maximum left context parameter.

As detailed further below, block 302 may include calculating patterns without the use of "don't care" hyphenation codes, as represented at block 304. Block 302 may also include calculating patterns that include "don't care" hyphenation codes, as represented at block 306. This description elaborates further on blocks 304 and 306, beginning with FIG. 4 below.

Block 308 represents selecting some subset of the patterns generated in block 302, with FIG. 3 denoting the overall generated patterns at 310, and denoting the selected subset of patterns at 312. Block 308 may include calculating a minimal subset of all patterns that would give the same quality over the training data, and may include eliminating those patterns that overlap with one another. If more than one pattern covers a given uncovered portion of an input word, block 308 may include choosing the pattern that occurs most frequently and has the shortest length. Thus, block 308 may reduce the number of patterns by selecting a subset of the patterns that performs similarly to the whole set of patterns. Optionally, block 308 may include merging the generated patterns with manually created patterns in a single data structure, and loading both into the lexicon file (e.g., 120 in FIGS. 1 and 2).

Block 308 may include loading the extracted patterns with frequency information into a dictionary, which may take the form of a finite state automaton, as represented in block 314. In turn, block 316 represents reading the training data for a second time. For the characters occurring in the input words, block 318 represents calculating patterns that match within a given input word, and that specify substantively whether to hyphenate within the input word. If the selected patterns have already been selected into a subset, then block 318 may include advancing to the next character within the word, or advancing to the next word. If multiple patterns match at least part of the given word, then block 318 may include selecting the pattern that occurs most often and has the shortest length. Having described the process flows 300 in FIG. 3, the discussion now proceeds to a description of process flows for calculating patterns without "don't care" codes, now presented in FIG. 4.

Figure 4:
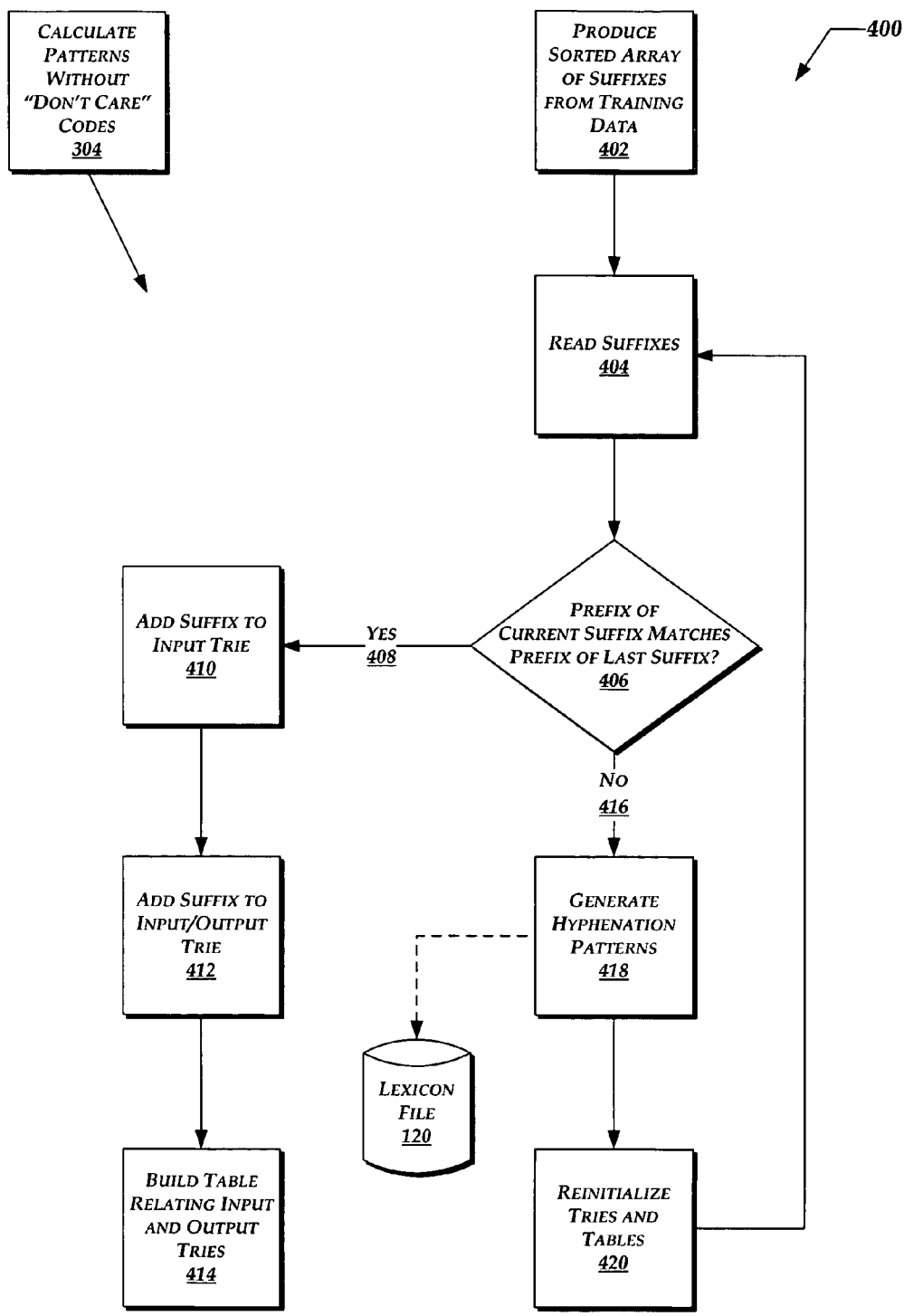
FIG. 4 is a flow diagram of processes for calculating the hyphenation patterns without "don't care" codes.

FIG. 4 illustrates process flows, denoted generally at 400, for calculating patterns without "don't care" codes. For ease of reference, and not limitation, FIG. 4 may carry forward some reference numbers from previous drawings to refer to similar items. For example, FIG. 4 carries forward from FIG. 3 the processing block 304, which represents calculating the patterns without "don't care" codes.

For the purposes of this description, the character "^" represents a delimiter that is artificially added before individual words in the training data, with this delimiter providing a "left" anchor for the words. In addition, the character "$" represents a delimiter that is artificially added after individual words in the training data, with this delimiter providing a "right" anchor for the words. As described further below, these anchors marking the beginnings and the ends of these words may enable the generation of hyphenation codes and patterns.

Within the various hyphenated words in the training data, the description herein refers to characters of these words, including the artificially added anchors, as input-weights (i.e., Iw). The description also refers to output hyphenation codes associated with these characters as output-weights (i.e., Ow). Thus, the Iw sequence is an input word including the artificially added anchors, and the Ow sequence is a sequence of hyphenation codes corresponding to the Iw sequence.

Block 402 represents producing a lexicographically sorted array containing the suffixes (or substrings) of the words from the training data. The suffixes are associated with respective chains of hyphenation codes, with the characters within a given suffix being associated with a bit within the hyphenation code. For a given character within the suffix, a "1" bit indicates that a hyphen may occur after this character, and a "0" bit indicates that a hyphen is not to occur after this character. This bit convention is provided only for the purposes of this description, and not to limit possible into limitations.

If a given suffix is longer than maximum pattern length (as specified in the induction parameters 118), then block 402 may include truncating the suffix to be at most the maximum length permitted for the pattern. Block 402 may also include extracting suffixes are at least the minimal length permitted for the pattern. As described above, the suffixes may be delimited with the left anchor (e.g., A) and the right anchor (e.g., $). The resulting array of suffixes may also indicate how frequently the different suffixes occur within the training data. Different substrings adding the same hyphenation points may be calculated as a sum of the frequencies of all words having the same hyphenation points. Finally, if the induction parameters so specify, block 402 may include filtering out those suffixes that provide no positive hyphenation codes.

To provide an example for discussion, but not to limit possible implementations, the description provides below a suffix array that is constructed from five words: ape, ap[=]ply, ap[=]ple, ap[=]pli[=]ca[=]tion, and ma[=]ple. For the purposes of this example, MinLen is set to 3 and MaxLen is set to 8. The format for this example suffix array is as follows: frequency, suffix, a sequence of hyphenation codes.

| | | |
|---|---|---|
| 1 | ^ape$ | 00000 |
| 1 | ^apple$ | 0010000 |
| 1 | ^applica | 00100101 |
| 1 | ^apply$ | 0010000 |
| 1 | ^maple$ | 0010000 |
| 1 | ape$ | 0000 |
| 1 | aple$ | 10000 |
| 1 | apple$ | 010000 |
| 1 | applicat | 01001010 |
| 1 | apply$ | 010000 |
| 1 | ation$ | 100000 |
| 1 | cation$ | 0100000 |
| 1 | ication$ | 10100000 |
| 1 | ion$ | 0000 |
| 2 | le$ | 000 |
| 1 | lication | 01010000 |
| 1 | ly$ | 000 |
| 1 | maple$ | 010000 |
| 1 | on$ | 000 |
| 1 | pe$ | 000 |
| 2 | ple$ | 0000 |
| 1 | plicatio | 00101000 |
| 1 | ply$ | 0000 |
| 1 | pple$ | 10000 |
| 1 | pplicati | 10010100 |
| 1 | pply$ | 10000 |
| 1 | tion$ | 00000 |

Block 404 represents reading the suffixes sequentially. For a given suffix in the array, and for a next suffix in the array after the given suffix, decision block 406 represents determining whether a minimum length prefix of the current suffix is the same as a minimum length prefix of the next suffix. If yes, the process flow 400 may take Yes branch 408 to block 410, which represents adding the suffix to an input (Iw) trie, as described in further detail below. In addition, block 412 represents adding the suffix to an input/output (Iw/Ow) trie, as also described in more detail below. Finally, block 414 represents updating a table that relates the input and input/output tries. It is noted that blocks 410, 412, and 414 may be performed in any order or sequence, and implementations of the description herein are not limited to the order shown in FIG. 4. For example, blocks 410 and 412 may be performed in sequence or in parallel.

Figure 5:
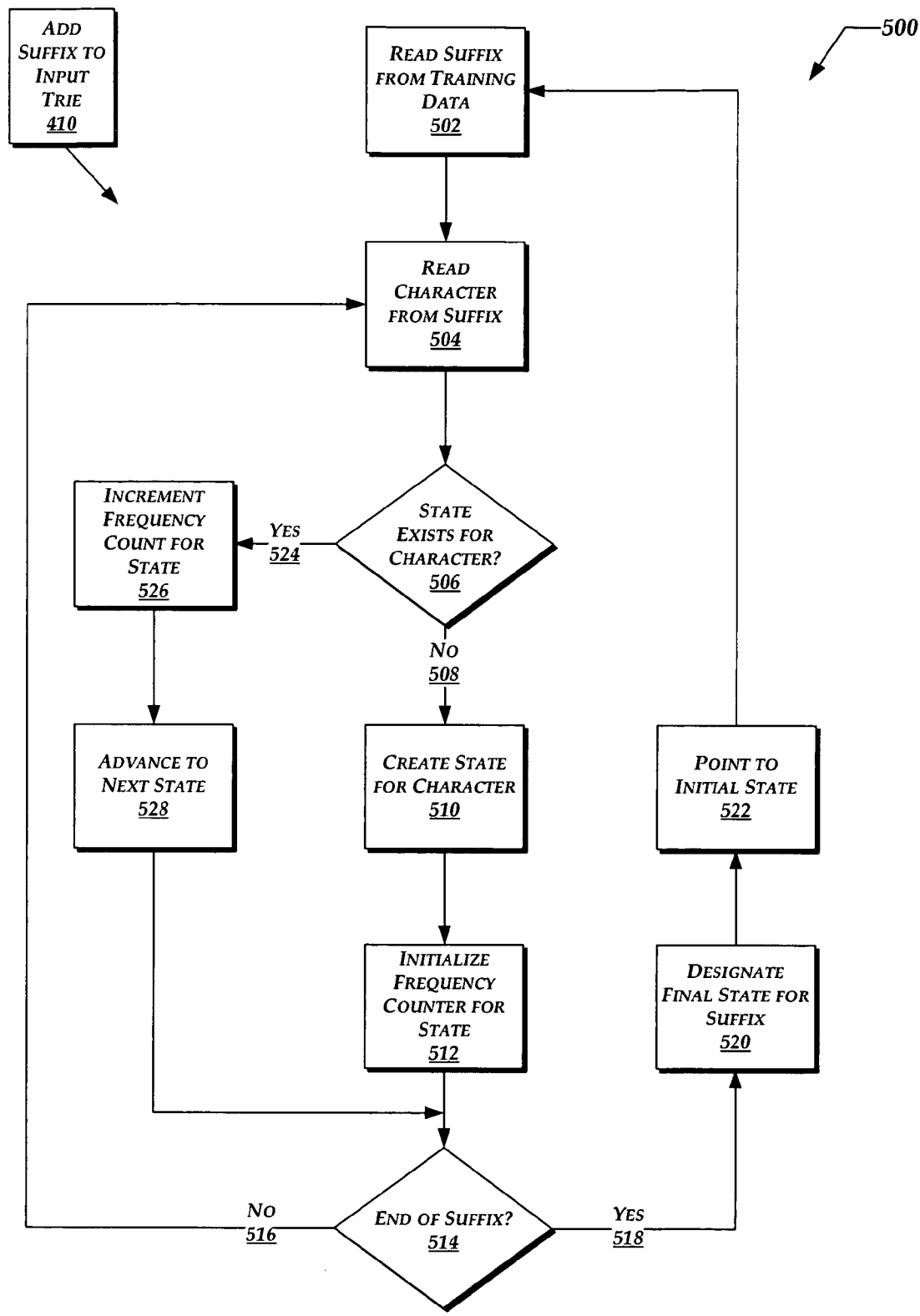
FIG. 5 is a flow diagram of processes for adding suffixes to an input trie.
Figures 6A, 6B:
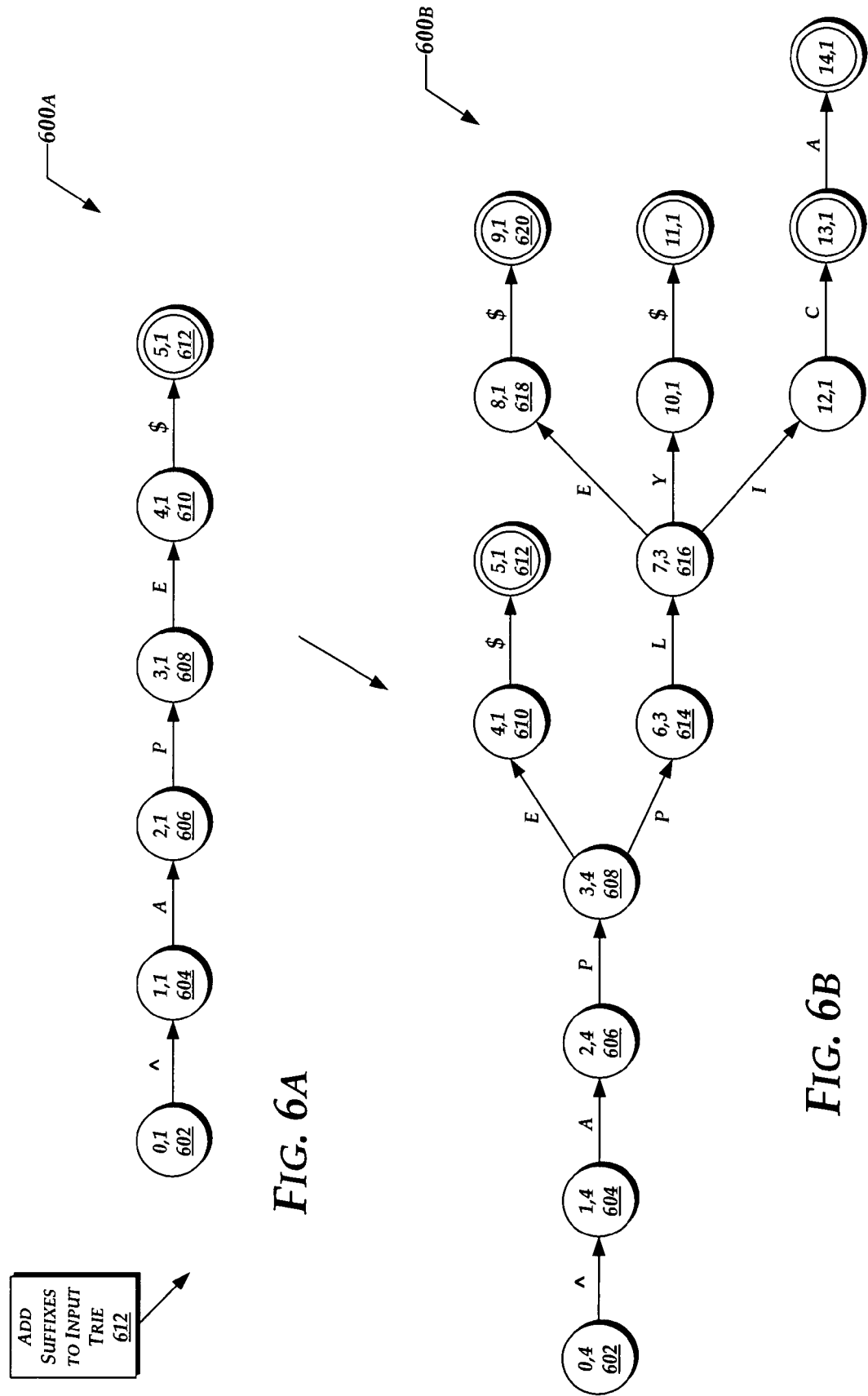
FIGS. 6*a* and 6*b* are state diagrams illustrating examples of the input trie in various stages of construction, according to the processes shown in FIG. 5.
Figure 7:
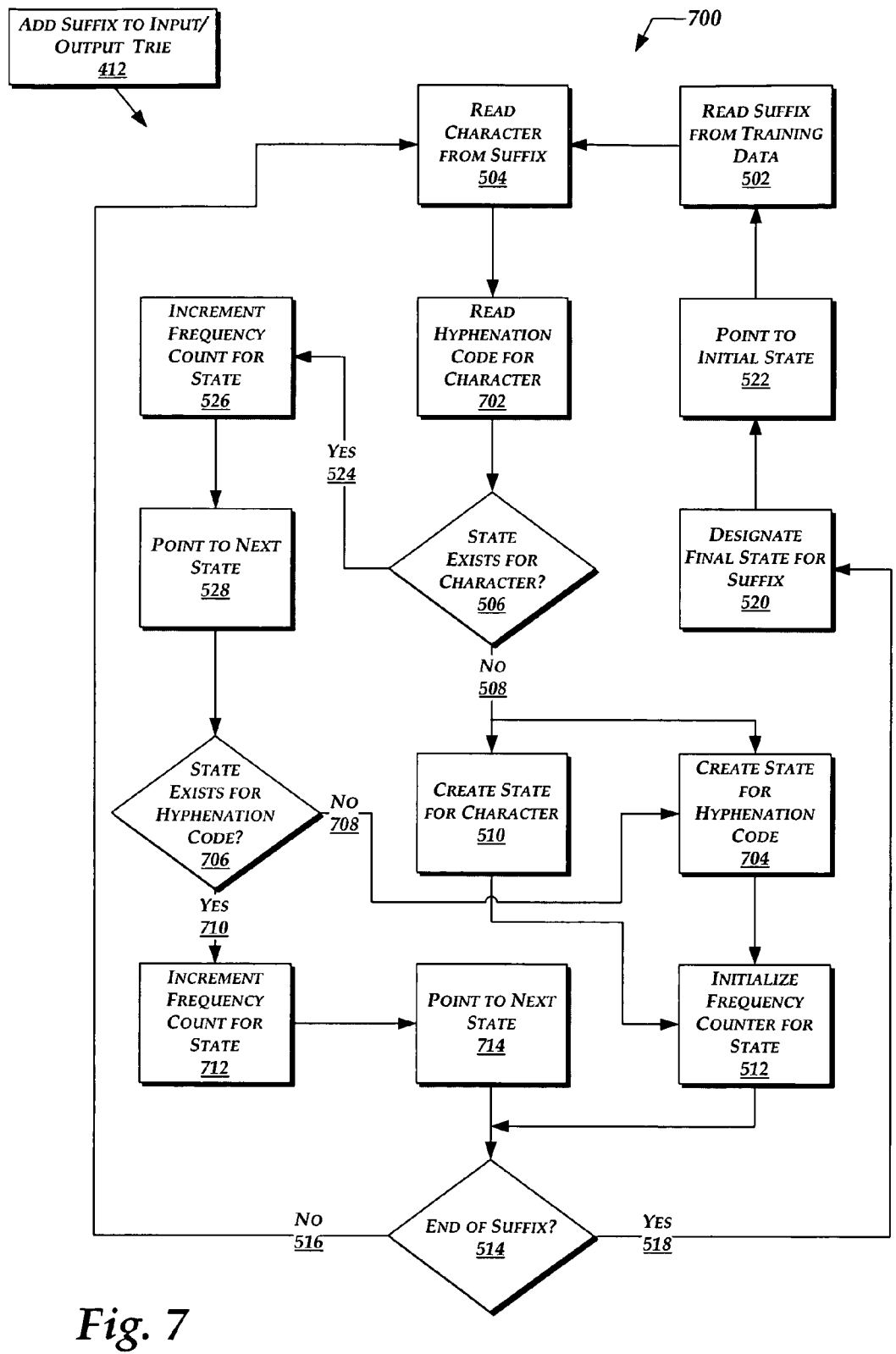
FIG. 7 is a flow diagram of processes for adding suffixes to an input/output trie.
Figures 8A, 8B:
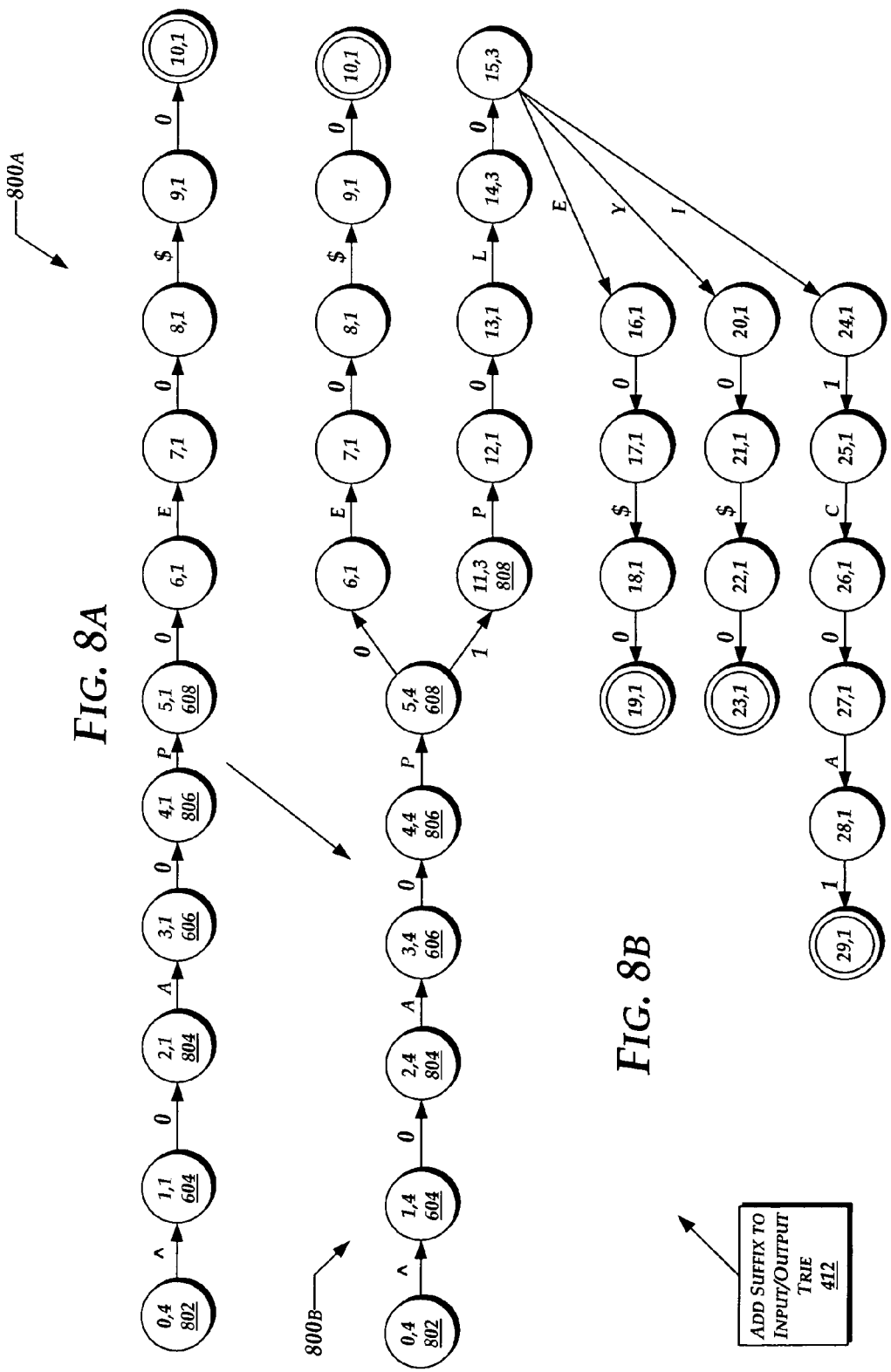
FIGS. 8*a* and 8*b* are state diagrams illustrating examples of the input/output trie in various stages of construction, according to the processes shown in FIG. 7.

To illustrate examples of the processing represented in blocks 410 and 412, FIG. 5 provides examples of processes 500 for adding suffixes to the input trie, and FIGS. 6a and 6b illustrate examples of the input trie in various stages of construction. FIG. 7 illustrates examples of processes 700 for adding suffixes to the input/output trie, and FIGS. 8a and 8b illustrate examples of the input/output trie in various stages of construction. To provide examples of the above processing, FIGS. 5 through 8b are now described with a reduced set of suffixes, specifically the first four suffixes in the above example suffix array, up to but not including the suffix "^maple$".

Turning now to FIG. 5, read in conjunction with FIGS. 6a and 6b, FIG. 5 illustrates process flows, denoted generally at 500, for adding suffixes to an input trie. Block 502 represents reading a suffix from the training data. In this example, the training data includes the first four suffixes shown in the suffix array above. To begin the process, block 502 may include reading the first suffix ("^ape$") from the suffix array, and block 504 may include reading a character from the suffix. In this example, the first character in the first suffix is "^". Decision block 506 then determines whether a state exists in the input trie for the current character. If no state currently exists for the present character, the process flows 500 may take No branch 508 to block 510, which represents creating a new state in the input trie for the current character.

Turning to FIG. 6a, this figure presents preliminary states of the input trie, denoted generally at 600a. The input trie may include an initial state 602. In FIGS. 6a and 6b, as well as FIGS. 8a and 8b, states are represented by circles with two numbers inside them. The first of these numbers represents a state number that identifies a given state. For example, the state 602 is designated state "0".

The second number within the given states is a frequency counter that represents how many times this state occurs in a given set of training data. Put differently, the frequency counter for a given state tracks how many times the process flows 500 pass through that given state for the set of training data. The frequency counters for new states may be initialized to a value of "1" when created.

Continuing the example from FIG. 5, block 510 may include creating a new state 604, to which the initial state 602 transitions upon reading the "^" character. FIG. 6a represents these transitions by the arrow connecting circles 602 and 604. The new state 604 is designated state "1", and its frequency counter may be initialized to one, as represented in FIG. 5 at 512.

Returning to FIG. 5, decision block 514 represents determining whether the process flows 500 have reached the end of a particular suffix. If not, the process flows 500 may take No branch 516 to return to block 504. Continuing the current example, the output of block 514 would be negative, and the process flows 500 would return to block 504 to read the next character from the current suffix. This next character would be "a".

Repeating decision block 506 for the new character, no state currently exists in the input trie for the letter "a". Thus, the process flows 500 proceed to block 510 to create a new state for this character. Accordingly, referring to FIG. 6a, block 510 would create a new state 606, designate this new state as state "two", and block 512 would initialize the frequency counter to one. The state 604 may transition to the new state 606, as indicated by the arrow connecting the circles 604 and 606 in FIG. 6a.

Returning to decision block 514 in FIG. 5, continuing the current example, the process flows 500 have not yet reached the end of the first suffix. Therefore, the process flows would take No branch 516 back to block 504 to read the next character from the current suffix. In this example, the next character is "p". Because no state in the input trie 600a currently exists for the character "p", decision block 506 takes No branch 508 to block 50, to create a state for the character "p". In FIG. 6a, block 510 would create a new state 608, designated as state "3". Block 512 would initialize the frequency counter of the new state 608 to one. Thus, the input trie 600a would transition from state 606 to 608, as indicated by the arrow connecting these circles 606 and 608 in FIG. 6a.

In FIG. 5, at decision block 514, the process flows 500 have not yet reached the end of the current suffix. Therefore, the process flows 500 one return to block 504 to read the next character from the current suffix. In the current example, the next character is "e". Because no new state currently exists in the input trie 600a for the character "e", block 510 would create a new state, denoted at 610 in FIG. 6a. The new state 610 is designated state "4", and block 512 initializes the frequency counter to one. The input trie 600a would transition from state 608 to state 610, as indicated by the arrow connecting circles 608 and 610 in FIG. 6a.

In FIG. 5, at decision block 514, the process flows 500 have not yet reached the end of the first suffix. Therefore, the process flow 500 returns to block 504 to read the next character from the first suffix. In this current example, the next character is "$". At decision block 506, no state currently exists in the input trie 600a for the character "$". Therefore, block 510 creates a new state 612 for the current character. The new state 612 is designated as state "5", and block 512 initializes the frequency counter for the new state to one. The input trie 600a would transition from the state 612 to the new state 612, as indicated by the arrow connecting these circles 610 and 612 in FIG. 6a.

In FIG. 5, at decision block 514, the process flows 500 have now reached the end of the first suffix. Therefore, the process flows 500 take Yes branch 518 to block 520, which represents designating a final state for the suffix. In FIG. 6a, block 520 would designate the state 612 as the final state for the current suffix, as indicated by the double circle. In FIG. 5, block 522 represents resetting the input trie 600a to an initial state. Put differently, block 522 may include setting a pointer so that the process flows 500 access the initial state 602 in the input trie 600a.

In FIG. 5, the process flows 500 would return to block 502 to read the next suffix from the training data. In the ongoing example, the next suffix is "^apple$". In turn, block 504 would read the first character from the new suffix, which in this example is "^". In comparing the current suffix "^apple$" to the previous suffix "^ape$", the first three characters are the same. Therefore, from decision block 506, the process flows 500 would take Yes branch 524 to block 526 for these three characters. Block 526 represents incrementing the frequency counter for the states corresponding to the matching first three characters of the current suffix and the previous suffix. Therefore, block 526 would increment the frequency counter for the states 602, 604, 606, 608, and 610, as shown in FIG. 6a. In turn, block 528 represents advancing to a next state in the input trie 600a, so that as new characters are read in the current suffix, the process flows 500 may determine whether these new characters match the previous suffix.

After processing the three matching characters "^", "a", and "p", the process flows 500 would advance to the decision block 514, to test whether the process flows 500 have reached the end of the current suffix. In this example, the current suffix is "^apple$", so at this point, the process flows 500 have not yet reached the end of the current suffix. Therefore, the process flows 500 return to block 504 to read the next character from the current suffix. In the current example, this next character is "p".

For ease of description and illustration, the discussion of FIG. 6a transitions to a discussion of FIG. 6b, with the states 602, 604, 606, 608, 610, and 612 carried forward into FIG. 6b. From the state 608 shown in FIG. 6b, decision block 506 would determine that a state does not exist for the current character "p", because the first suffix was "^ape$". Therefore, block 510 would create a new state 614 for the current character "p", as shown in FIG. 6b. Block 510 designates the new state 614 as state "6", and block 512 initializes the frequency counter for the new state 614 to one.

Block 514 determines that the process flows 500 have not yet reached the end of the current suffix. Therefore, block 504 reads the next character from the current suffix with this character being "l". The process flows 500 continue in a similar manner as described above to create new state 616 for the new character "l", a new state 618 for the next character "e", and a new final state 620 for the current suffix.

The process flows 500 may continue in similar manner to process the final two suffixes "^applica", and "^apply$" in the example array, resulting in the final input trie 600b as shown in FIG. 6b. In the interest of conciseness, this discussion omits the specific description of creating the additional states shown in FIG. 6b. Having described the processes 500 for adding suffixes to an input trie as shown in FIGS. 5, 6a, and 6b, the discussion now proceeds to a description of adding suffixes to an input/output trie, now presented with FIGS. 7, 8a, and 8b.

FIG. 7 illustrates process flows, denoted generally at 700, for adding suffixes to an input/output trie. FIGS. 8a and 8b illustrate examples of the input/output trie in various stages of construction, denoted respectively at 800a and 800b. For ease of reference and description, but not to limit possible implementations, FIGS. 7, 8a, and 8b may carry forward reference numbers from previous drawings to refer to similar items. For example, FIG. 7 carries forward references 502-522 from FIG. 5, as well as block 412 from FIG. 4. In addition, FIGS. 8a and 8b carry forward block 412 from FIG. 4.

FIGS. 7, 8a, and 8b pertain to building input/output tries, and are described using the same example used above with FIGS. 5, 6a, and 6b. For ease of reference, the four suffixes used in this example are reproduced here, with frequency information, the suffix string, and the hyphenation codes shown as follows:

| 1 | ^ape$    | 00000     |
| 1 | ^apple$  | 0010000   |
| 1 | ^applica | 00100101  |
| 1 | ^apply$  | 0010000   |

The input/output tries shown in FIGS. 8a and 8b are in some ways similar to the tries shown in FIGS. 6a and 6b. However, the tries 800a and 800b transition states based not only upon input characters, but also upon the output hyphenation codes shown above, as now described.

Turning now to FIG. 7, read in conjunction with FIGS. 8a and 8b, and beginning with an input/output trie 800a that contains an initial state 802, blocks 502 and 504 operate as described above in FIG. 5 to read the first suffix ("^ape$") from the array of suffixes and to read the first character ("^") from this first suffix. In addition, block 702 represents reading a hyphenation code associated with the character read in block 504. In this example, a hyphenation code of "0" is associated with the first character ("^") in the first suffix.

In turn, block 506 evaluates whether a state exists for the current character in the input/output trie 800a. In this example, the input/output trie does not contain a state for the "^" character. Thus, the process flows 700 take No branch 508 to block 510, which creates a new state for the current character in the input/output trie. For ease of reference, but not limitation, FIG. 8a carries forward the state 604 from FIG. 6a. In addition, block 704 represents creating a new state for the hyphenation code associated with the new character. FIG. 8a denotes this new state at 804, and the input/output trie may transition from the state 604 to the state 804 as indicated by the arrow connecting the circles 604 and 804 in FIG. 8a.

As shown in FIG. 7, block 512 represents initializing respective frequency counters associated with the states 804 and 604. In turn, decision block 514 determines that the process flows 700 have not yet reached the end of the current suffix. Thus, the process flows 700 return to block 504 to read the next character from the current suffix. In the current example, the next character in the suffix is "a", and the hyphenation code associated with this next character is "0". Decision block 506 would determine that a state does not exist in the input/output trie for this new character. Therefore, block 510 would create a new state in the input/output trie (e.g., state 606 carried forward from FIG. 6a). In addition, block 704 would create a new stage 806 in the input/output trie or the hyphenation code "0".

In a similar manner, the process flows 700 would continue to build the input/output trie 800*a*, completing the first suffix "^ape$" and the hyphenation codes associated with the characters in the first suffix. When the first suffix is completed, decision block 514 would take Yes branch 518 to blocks 520 and 522, which operate as described above in FIG. 5. Afterwards, block 502 would read the next suffix from the training data. In this example, this next suffix is "^apple$", and blocks 504 and 702 would respectively read the first character ("^") and associated first hyphenation code ("0") for the next suffix.

Recall from the previous examples that given a current suffix of "^apple$", and a previous suffix of "^ape$", the first three characters in both suffixes match. However, in the suffix "^apple$", a hyphenation code of "1" appears after the third character "p". This indicates that it is permissible for hyphenation to occur between the two characters "p" that appear in the suffix "^apple$". Therefore, when the process flows 700 reach decision block 506 for the third character in the suffix "^apple$", decision block 506 would determine that state 608 exists for this character. Accordingly, the process flows 700 will take Yes branch 524 to block 526 to increment the frequency counter for the state 608, and block 528 will point to a next stage in the input/output trie.

Decision block 706 represents evaluating whether a state exists for the hyphenation code for the current character. In this example, although the state 608 exists for the character "p", this state transitions in response to a hyphenation code of "0", rather than the hyphenation code of "1" as specified for the current character "p". Therefore, decision block 706 will determine that a state does not exist for the current hyphenation code, and will thus take No branch 708 to block 704.

For ease of discussion, but not limitation, FIG. 8*a* transitions to FIG. 8*b* as shown. As discussed above, block 704 creates a new state for a hyphenation code, in this case, a new state 808 as shown in FIG. 8*b*. Therefore, if process flows 700 reach the state 608 in the input/output trie 800*b*, the trie may transition to different states, depending on whether or not an input character "p" is associated with a hyphenation code of "0" or "1".

After block 704 creates a new state 808 for the hyphenation code associated with the input character "p", block 512 may initialize a frequency counter for the new state. Returning briefly to decision block 706, if for a given input suffix, a state exists for a hyphenation code in that suffix in the input/output trie, the process flows 700 would take Yes branch 710 to block 712. Block 712 represents incrementing a frequency counter for the state, and block 714 represents pointing to a next state in the input/output trie.

Turning to FIGS. 8*a* and 8*b*, the foregoing process flows 700 may continue to process the input suffixes in the manner described, resulting ultimately in the completed input/output trie 800*b*, with the state numbers and frequency information as indicated. In the interests of conciseness, however, the description does not detail the entire creation of the input/output trie 800*b*.

In describing the input trie and the input/output trie, it is noted that the process flows 500 and 700 may perform in a variety of relationships to one another. For example, these process flows may operate at least partially in parallel or in sequence with one another. Therefore, the examples provided herein are understood to be illustrative rather than limiting.

The table provided below relates the states in the Iw trie (e.g., FIGS. 6*a* and 6*b*) to corresponding states in the Iw/Ow trie (e.g., FIGS. 8*a* and 8*b*), as follows:

|  | Iw-trie state | | | | | | | | | | | | | | |
| --- | --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 | 14 |
| IwOw-trie state | 0 | 2 | 4 | 11 | 8 | 10 | 13 | 15 | 17 | 19 | 21 | 23 | 25 | 27 | 29 |

To create the above table, and to identify which states from the Iw/Ow-trie correspond to which states from the Iw trie, the process flows may correlate the states between two tries, as the states are added to the tries. If the process flows determine that two or more states from the Iw/Ow trie correspond to a given state in the Iw trie, the process flows may compare the frequencies of the multiple states in the IwOw trie, select the IwOw state occurring the most frequently, and correlate this state with the state from the Iw trie.

In the example given, if multiple states in the Iw/Ow trie correspond to a state in the Iw trie, then the above table may specify the state in the Iw/Ow trie that occurs most frequently among these multiple states. For example, comparing the Iw trie 600*b* in FIG. 6*b* to the Iw/Ow trie in FIG. 8*b*, state 3 in the Iw trie may correspond to state 6 or state 11 in the Iw/Ow trie. However, the above table relates state 3 in the Iw trie to state 11 in the IwOw trie because state 11 occurs more frequently than state 6 (comparing the frequency counts for the two states).

Having elaborated on block 410 for adding suffixes to an input trie in connection with FIGS. 5 and 6*a*-6*b*, and having elaborated on block 412 for adding suffixes to an input/output trie in connection with FIGS. 7 and 8*a*-8*b*, the discussion now returns to FIG. 4 to continue at decision block 406. From decision block 406, if the prefix of the next read suffix changes, or when the end of file is reached for the array of suffix, then the process flows 400 may take no branch 416 to block 418, which represents generating the hyphenation patterns.

Block 418 may include loading the generated patterns into the lexicon file (e.g., 120), as indicated by the dashed arrow in FIG. 4 linking block 418 to block 120. Block 418 may also include generating patterns that correspond to only a given prefix within the suffix array. In implementations where conserving memory is a priority, block 418 may generate patterns incrementally, and thereby avoid creating memory-expensive tries for the whole suffix array.

Turning to block 418 in more detail, the process flows 400 may traverse depth-first the input trie (Iw) that was constructed as shown in FIG. 6*b* (e.g., 600*b*), and may traverse the input/output trie (Iw/Ow) that was constructed as shown in FIG. 8*b*. Entries from the Iw trie and the Iw/Ow trie may be stored in a data structure such as a stack, with the stack storing tuples including, for example:

<input characters (Iw), output hyphenation codes (Ow), state numbers within the Iw/Ow trie, state numbers within the Iw trie, depth>.

Data structures, such as arrays Iws[ ] and Ows[ ], may store input and output symbols up to the given depth. Block 418 may include popping new tuples from the stack. Block 418 may also include checking whether the sequence traversed in the tries, as represented in these tuples, satisfies constraints applicable to generating the hyphenation patterns.

The length of the potential hyphenation pattern corresponds to the depth of the traversal within the tries. Block 418 may include calculating the precision of a potential pattern by analyzing the frequency counts stored in the states within Iw/Ow trie and the Iw trie, as indicated by the above table. More specifically, block 418 may include dividing the frequency of the IwOw-State by the frequency of the Iw-State. If the traversed sequence satisfies the applicable constraints, then block 418 may include returning this traversed sequence as a valid pattern. In this case, block 418 would traverse no deeper along this branch of a trie, in implementations prioritizing the shortest patterns. After traversal is complete, block 418 may return the tries and the map into the initial state (i.e., made empty.)

For the example above, processing the first four suffixes in the suffix array, two patterns would be generated as follows, expressed in an example format listing frequency, the substring, and a sequence of hyphenation codes:

| 1 | ^ape | 0 0 0 0 |
| 3 | ^app | 0 0 1 0 |

In this example, the shorter pattern (^ap 0 0 1) would not be generated, because it would not satisfy precision constraints. Assuming, for example, that precision constraints have been set to 100%, the frequency of state 11 in the IwOw trie as divided by the frequency of state 3 in the Iw trie is ¾ (i.e., 75%). In an example setting the precision constraint to 75%, block 418 would generate one pattern instead of two patterns, as follows:

3 ^ap 001

In the example above, the whole list of generated patterns (assuming 100% precision, and excluding patterns that do not include hyphenation points) may be as follows:

| 3 | ^app | 0 0 1 0 |
| 1 | ma | 0 0 1 |
| 1 | apl | 1 0 0 |
| 3 | app | 0 1 0 |
| 1 | ati | 1 0 0 |
| 1 | cat | 0 1 0 |
| 1 | ica | 1 0 1 |
| 1 | lic | 0 1 0 |
| 1 | map | 0 1 0 |
| 1 | pli | 0 0 1 |
| 3 | ppl | 1 0 0 |

Referring briefly back to FIG. 3, different implementations of pattern generation, as represented in block 302, may or may not use "don't care" hyphenation codes. The foregoing descriptions of generating hyphenation codes did not utilize "don't care" codes, and therefore elaborate on block 304 shown in FIG. 3. However, some implementations may utilize "don't care" hyphenation codes, as represented in FIG. 3 at 304, as now described in more detail here.

For ease of description, but not limitation, the description herein refers to algorithms that do not use "don't care" codes as "Algorithms A", and refers to algorithms that use "don't care" codes as "Algorithms B". Some implementations of Algorithm A may generate patterns that specify hyphenation treatment of each input character that matches the pattern. In some instances, conflicts may arise. For example, a given input substring s may be hyphenated more than one way. In such instances, the algorithms may increase the substring, but not more than the maximum length permitted for the substring, until the conflict is resolved or the whole word is generated as a pattern. However, considering more characters to solve one conflict may create new conflicts, whose resolution may involve consuming even more characters.

To address these types of scenarios, Algorithm B may consider more input letters, but at least some of the output weights (i.e., hyphenation codes) corresponding to these input letters may be assigned particular values that mean "don't care". Put differently, these particular values indicate that the output weights assigned to the corresponding input characters do not specify whether these input characters may be hyphenated. Because these output weights do not specify hyphenation, these output weights would not conflict with other patterns.

Block 306 represents examples of Algorithm B, and may proceed as follows. Assuming a numbering convention in which position 0 corresponds to the left anchor character, and position one corresponds to the leftmost character in the given substring, for character positions from position 1 up to the specified maximum left context (equal or smaller to the maximum permitted length), block 306 may include creating separate instances of Algorithm A. For example, this discussion denotes such instances of Algorithm A as Algorithm A[i]. For all instances of Algorithm A[i], block 306 may include setting the minimum permitted length to be the maximum of {i, MinLen}, so that block 306 would not generate patterns containing only "don't care" codes. Then, for every input suffix (as described above in Algorithm A) and its corresponding sequence of hyphenation codes, block 306 feed every instance of Algorithm A[i] with its input suffix and sequence of the hyphenation codes. The i-th hyphenation code remains as originally specified, and the rest of the hyphenation codes are "don't care" symbols.

The instances of the Algorithm A[i] in turn generate separate sets of hyphenation patterns, taking as much right context as appropriate to resolve any conflicts. Block 306 then merges all of the hyphenation patterns from the instances of the Algorithm A[i]. For example, if some patterns from two instances of Algorithm A (e.g., Algorithm A[i] and Algorithm A[j], where i !=j) operate on the same substring, but provide different annotations, then block 306 may merge these patterns into one pattern. This one pattern may be a union set of the hyphenation points as specified by the different instances of Algorithm A[i], with don't care" symbols inserted as appropriate to resolve any conflicts (e.g., "don't care" symbols are substituted with any other hyphenation codes).

Continuing the example above, an example list of generated patterns including "don't care" symbols, assuming 100% precision and excluding patterns without hyphenation points, may be provided as follows. In this example, the hyphenation code "7" represents the "don't care" symbol.

| 3 | ^app | 7 7 1 7 |
| 1 | ma | 7 7 1 |
| 1 | apl | 1 7 7 |
| 3 | app | 7 1 7 |
| 1 | ati | 1 7 7 |
| 1 | cat | 7 1 7 |
| 1 | ica | 1 7 1 |
| 1 | lic | 7 1 7 |
| 1 | map | 7 1 7 |
| 1 | pli | 7 7 1 |
| 3 | ppl | 1 7 7 |

After generating the hyphenation patterns in block 418, the process flows 400 may proceed to block 420, which represents reinitializing the input trie the input/output trie and the table that relates the states occurring within these two tries. Block 420 may include resetting or clearing these data structures to process a next set of suffixes. To read additional suffixes, the process flows 400 may return to block 404, as indicated by the arrow from block 420.

Having described the process as for generating hyphenation patterns in connection with block 418, the discussion now turns to descriptions of processes and data flows related to hyphenating input words at the request of client systems. These descriptions are now presented with FIG. 9.

Figure 9:
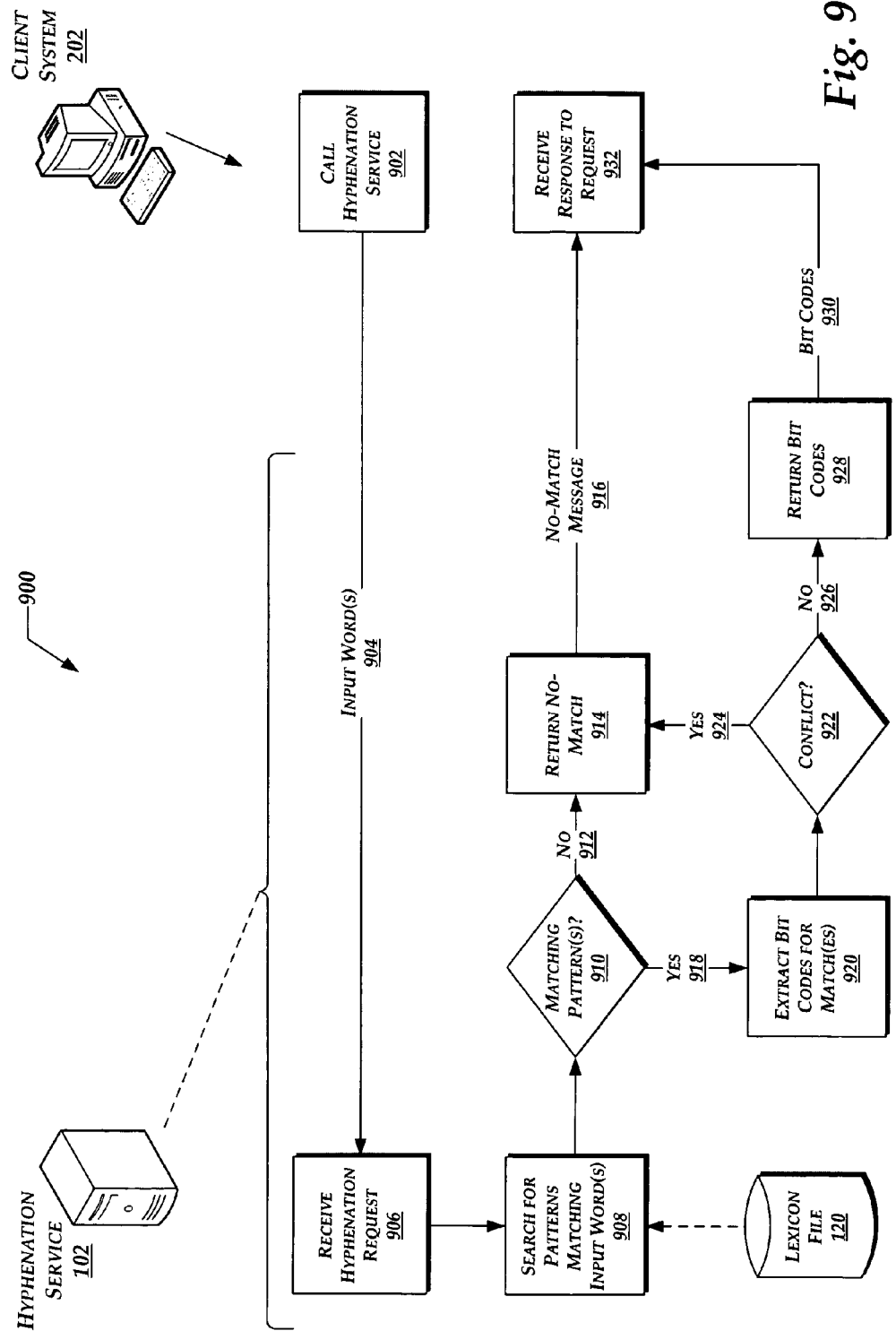
FIG. 9 is a combined data and flow diagram of processes for hyphenating input words using a lexicon file and hyphenation patterns generated as described herein.

FIG. 9 illustrates data and process flows, denoted generally at 900, for hyphenating input words. For ease of reference and description, but not to limit possible implementations, FIG. 9 may carry forward reference numbers from previous drawings to refer to similar items. For example, FIG. 9 carries forward an example client system 202 from FIG. 2, and illustrates a hyphenation service that may include the server 102 from FIG. 1.

FIG. 9 illustrates a scenario in which the hyphenation service is distributed across separate server and client systems, with the client and server systems coupled by, for example, one or more intermediate communications networks (not shown). However, it is noted that implementations of the hyphenation service may in some instances reside entirely on the client system, without departing from the spirit and scope of the description herein.

Turning to FIG. 9 in more detail, block 902 represents calling the hyphenation service to hyphenate one or more input words 904. Block 902 may, for example, include calling one or more application program interfaces (APIs). As shown in FIG. 9, the client system 202 may perform block 902.

At the hyphenation service 102, block 906 represents receiving the hyphenation request 904. In turn, block 908 represents searching for hyphenation patterns matching the input words 904. For example, block 908 may include searching the hyphenation patterns generated in block 418 in FIG. 4, which may be stored in the lexicon file 120 (carried forward from FIG. 1).

Decision block 910 represents determining whether the input words 904 match any hyphenation patterns. If the input words do not match any hyphenation patterns, the process flows 900 may take No branch 910 to block 914, which represents returning a no-match output 916 to the requesting client system 202. The no-match output 916 may, for example, include a suitable message.

Returning to decision block 910, if the input words 904 match any of the hyphenation patterns, the process flows 900 may take Yes branch 918 to block 920, which represents extracting a bit codes for the matching patterns. In the examples provided above, the bit codes may include sequences of bits that correspond to characters in an input word or substring, with these bits indicating whether the pattern permits hyphenation after the various input characters.

It is noted that more than one pattern may match a given input word. Thus, FIG. 9 labels blocks 910 and 920 to account for such scenarios. In some instances, different hyphenation patterns may match the given input word, and these different hyphenation patterns may provide different hyphenation codes for one or more given characters within the input word. These different hyphenation codes may conflict, in the sense that they specify different hyphenation treatment for these given characters. These hyphenation codes may also conflict in the sense that one code may allow hyphenation for the given character, while another code may disallow hyphenation for the same character.

The process flows 900 may resolve such conflict scenarios in a variety of ways. In but one possible example, block 922 may test for the existence of such conflicts for one or more characters. If a conflict is detected, the process flows 900 may take Yes branch 924 to block 914, which represents returning a no-hyphenation signal for any such conflicting characters. However, other scenarios are possible, including returning the conflicting hyphenation scenarios for resolution by a human user at the client system 202, returning the conflicting hyphenation scenarios for voting, or the like. Generally, conflicts would occur only within OOV words (i.e., words not within the training data).

If block 922 does not detect a hyphenation conflict, then the process flows 900 may take No branch 926 to block 928. In turn, block 928 represents returning the hyphenation bit codes located for the input words 904. FIG. 9 denotes these bit codes at 930. For those characters in the input word whose hyphenation codes do not conflict, block 928 may include returning these non-conflicting hyphenation codes.

At the client system, block 932 represents receiving a response to the request 902. In the example provided in FIG. 9, this response may take the form of a no-match message 916 (which may also indicate hyphenation conflicts), or the matching bit codes 930. Having received the response in block 932, the client system 202 may process this response as appropriate. For example, the client system 202 may be executing a word processing application that is operating on the input words 904. If the client system receives a no-match message 916, the client system may leave the input words 904 unhyphenated. In some scenarios, the client system may prompt a human user for resolve hyphenation conflicts, or may poll a plurality of human users to vote on resolving these hyphenation conflicts. Conversely, if the client system receives bit codes 930 for the input words 904, the client system may hyphenate the input words 904 according to the bit codes 930.

The processes and data flows 900 may be repeated any number of times for any number of input words 904. However, in the interest of clarity, FIG. 9 does not illustrate the details of these iterations for different input words.

Having provided the above description, several observations are now noted. Different languages may specify different hyphenation rules, requirements, or guidelines. These guidelines may address factors such as, but not limited to, syllabic hyphenation, hyphenation on the morpheme boundaries, a "one consonant" rule, "modifying" hyphenation of compound words, guidelines of not leaving or moving certain segments to the next line, guidelines for hard hyphens, and the like. Implementations of the above description may address such linguistic factors with a single approach that is both efficient and compact in terms of memory usage.

Many words with possible hyphenations and a long "tail" of Out-Of-Vocabulary (OOV) words may render it dictionary-based solutions both memory expensive and error-prone. Implementations of the above description may address these issues by using hyphenation patterns, with these hyphenation patterns corresponding to the smallest substring, including the beginning and the end of the word. These hyphenation patterns may also include annotations specifying which letters to hyphenate and/or not to hyphenate, how to adjust the hyphenated word. As a result, these implementations may use significantly less memory at run-time, as compared to dictionary-based solutions.

Manual development and maintenance of hyphenation patterns is typically labor-intensive and therefore expensive. The above description describes algorithms for automatically generating the hyphenation patterns with up to 100% accuracy from the training data (TD). This training data provides a set of correctly hyphenated words from which the algorithms inductively infer how to hyphenate other words from the same language. Implementations of these algorithms may provide up to 100% lower bound on accuracy for all words in the TD. In case of 100% accuracy, these algorithms may not only process words from the TD with no errors, but also process OOV words with a certain level of precision/recall. These algorithms provide a level of certainty that the most important/frequent words will be hyphenated correctly.

In cases where the training data contains errors, the algorithms described herein may produce patterns having accuracy lower than 100%, by considering how frequently certain substrings occur in the training data. This approach thus ignores lower frequency phenomena in the TD that may be exceptions and/or errors.

Implementations of the algorithms described herein may handle OOV words by reducing patterns that not only specify where and how to hyphenate the words, but may also specify the positions in the words where hyphen is not to occur. For example, at runtime, if for some OOV word, one hyphenation pattern specifies to hyphenate at a given position, and another hyphenation pattern specifies says not to hyphenate, the algorithms described herein may choose not to hyphenate for maximum precision. To handle these OOV words, given a specified lower bound of accuracy, the algorithms described herein may select patterns having higher frequency and shorter length, rather than patterns of longer length and/or higher frequency that cover the same span of the word in the training data.

To provide certain behavior from the hyphenation services described herein, such as consistently treating hard hyphens or apostrophes that are a part of a word, the techniques described herein are fights for combining patterns inductively processed from the training data with patterns specified manually. In some cases, by having only generated patterns (even of 100% precision), it may be difficult to predict the behavior of the hyphenation system for all possible inputs. For example, processing hard hyphens (i.e., hyphens are existing within an input word) or apostrophes may involve some deterministic actions. In these cases, manually written patterns may be added to the set of patterns generated from the training data. If the manually generated patterns conflict with the generated patterns, or with each other, the algorithms may resolve these conflicts identically, via performing no hyphenation in either case.

Although hyphenation patterns may be sufficient to handle hyphenation for all languages with 100% accuracy within the training data, some of the limitations of the algorithms described herein may use a dynamic decompounder to handle compound words. For example, in languages that use compound words, these compound words cannot be fully lexicalized in some instances. The dynamic decompounder (if used) may operate in at least three possible ways:

a) splitting the input word into segments and hyphenating each segment independently;

b) hyphenating the input word as a whole, and merging its hyphenation points with hyphenation points identified as segment boundaries by the decompounder; and/or c) annotating new training data using the techniques specified in a) or b), then generating a new set of patterns from this new training data. Later, the hyphenation services may use only these new patterns at runtime.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method comprising:
   receiving training data at a server computer system that include a plurality of hyphenated words;
   inductively generating hyphenation patterns at the server computer system from the received training data, via machine learning, comprising substrings occurring within the plurality of hyphenated words, and hyphenation codes identifying hyphenation points within the hyphenation patterns and associated respectively with characters occurring in the substrings, the hyphenation codes each corresponding to an action to be performed after a given input character occurs within a word, the action being selected from at least one of
   deleting a letter before the hyphen,
   adding a specified letter before the hyphen,
   changing the letter before the hyphen to some specified letter,
   changing a letter after the hyphen to some other specified letter, or
   deleting the letter before the hyphen and changing the letter after the hyphen to another specified letter;
   building at least one data structure at the server computer system comprising representations of the individual characters appearing within the substrings, wherein the data structure indicates how many times the substrings occur with the training data; receiving, at the server computer system, at least one induction parameter applicable to generating the hyphenation patterns, wherein the at least one induction parameter specifies a precision applicable to generating the hyphenation patterns, wherein the precision is related to a lower bound on accuracy with which input words not included in the training data may be hyphenated;
   storing at least one inductively generated hyphenation pattern at the server computer system comprising the substrings and the hyphenation codes as entries into a language-specific lexicon file; and
   receiving at least one request from a client computer system to hyphenate at least one input word occurring in a human language based on the stored at least one inductively generated hyphenation pattern.

2. The method of claim 1, wherein receiving training data includes receiving training data that includes at least some correctly-hyphenated words, wherein the hyphenation codes identify at least one hyphenation point where hyphenation is permitted, wherein the hyphenation codes identify at least one hyphenation point where hyphenation is not permitted.

3. The method of claim 1, further comprising merging at least one automatically generated hyphenation pattern with at least one manually created hyphenation pattern.

4. The method of claim 1, wherein generating hyphenation patterns includes generating hyphenation codes that include don't care codes.

5. The method of claim 1, wherein generating hyphenation patterns includes generating hyphenation codes that do not include don't care codes.

6. The method of claim 1, wherein building the data structure includes building a data structure that includes respective states corresponding to the individual characters, and includes representations of orders in which the characters occur within the substrings.

7. The method of claim 1, wherein building the data structure includes building a data structure that includes representations of sequences of hyphenation codes as associated respectively with sequences of the individual characters, wherein the hyphenation codes indicate whether hyphenation is permitted within an input word after occurrences of the individual characters.

8. The method of claim 7, wherein building the data structure includes building a data structure that includes respective states corresponding to sequences of the individual characters and respective states corresponding to sequences of the hyphenation codes, and includes representations of orders in which the characters and hyphenation codes occur within the substrings.

9. The method of claim 1, further comprising selecting at least one non-overlapping subset of the hyphenation patterns, wherein the subset of the hyphenation patterns performs similarly to the hyphenation patterns.

10. The method of claim 1, further comprising decompounding at least one compound word occurring in the training data into a plurality of segment boundaries, and further comprising merging a plurality of hyphenation points defined in the hyphenation codes with the segment boundaries.

11. The method of claim 1, wherein receiving training data includes receiving representations of a plurality of words hyphenated according to a first human language, and further comprising:
   receiving further training data including a further plurality of words hyphenated according to a further human language;
   inductively generating further hyphenation patterns that represent further substrings occurring within the further words, wherein the further hyphenation patterns include at least the further substrings and further hyphenation codes associated respectively with further characters occurring in the further substrings;
   receiving at least one further induction parameter applicable to generating the further hyphenation patterns; and
   storing at least the further substrings and the further hyphenation codes as entries into a further lexicon file specific to the further human language.

12. One of an optical storage device, a semiconductor storage device or a magnetic storage device having computer-executable instructions stored thereon which, when executed by a computer, cause the computer to perform a method comprising:
   receiving at least one request from a client computer system to hyphenate at least one input word occurring in a human language;
   evaluating at a server computer system how to process the request based at least in part on the human language;
   searching, at the server computer system, for a least one hyphenation pattern comprising a substring occurring in the at least one input word and at least one hyphenation code identifying hyphenation points within the at least one hyphenation pattern and associated respectively with characters occurring in the substrings, the at least one hyphenation code corresponding to an action to be performed after a given input character occurs within a word, the action being selected from at least one of
      deleting a letter before the hyphen,
      adding a specified letter before the hyphen,
      changing the letter before the hyphen to some specified letter,
      changing a letter after the hyphen to some other specified letter, or
      deleting the letter before the hyphen and changing the letter after the hyphen to another specified letter,
   wherein at least the one hyphenation pattern is stored in a language-specific lexicon file that is created inductively, via machine learning at the server computer system, based on training data; and
   responding from the server computer system to the at least one request from the client computer system, wherein the response at least indicates whether the at least one hyphenation pattern occurred in the at least one input word.

13. The optical storage device, semiconductor storage device or magnetic storage device of claim 12, further comprising instructions for calculating zero or more hyphenation points or hyphenation types in response to the evaluating.

14. The optical storage device, semiconductor storage device or magnetic storage device of claim 13, wherein the instructions for receiving at least one request include instructions for receiving a request to hyphenate at least one compound input word, and further comprising decompounding the compound input word into a plurality of segment boundaries.

15. The optical storage device, semiconductor storage device or magnetic storage device of claim 14, further comprising instructions for converting the segment boundaries into hyphenation points.

16. The optical storage device, semiconductor storage device or magnetic storage device of claim 14, further comprising instructions for merging the at least one hyphenation point with a plurality of segment boundaries resulting from decompounding the compound input word.

17. The optical storage device, semiconductor storage device or magnetic storage device of claim 12, further comprising instructions for:
   receiving at least a further request to hyphenate at least a further input word occurring in a further human language;
   evaluating how to process the request based at least in part on the further human language;
   searching for a least a further hyphenation pattern comprising a further substring occurring in the further input word, wherein at least the further hyphenation pattern is stored in a further lexicon file that is specific to the further human language and that is created inductively based on further training data; and
   responding to the further request, wherein the further response at least indicates whether the at least one further hyphenation pattern occurred in the further input word.

18. A word hyphenation system comprising:
a least one server adapted to:
receive training data that includes a plurality of hyphenated words;
receive at least one induction parameter applicable to generating hyphenation patterns;
based on the at least one induction parameter, inductively generate the hyphenation patterns, from the training data via machine learning, comprising substrings occurring within the plurality of hyphenated words, and hyphenation codes identifying hyphenation points within the hyphenation patterns and associated respectively with characters occurring in the substrings, the hyphenation codes each corresponding to an action to be performed after a given input character occurs within a word, the action being selected from at least one of deleting a letter before the hyphen, adding a specified letter before the hyphen, changing the letter before the hyphen to some specified letter, changing a letter after the hyphen to some other specified letter, or deleting the letter before the hyphen and changing the letter after the hyphen to another specified letter; and store at least the substrings and the hyphenation codes as entries into a language-specific lexicon file specific to a human language;

wherein the server is further adapted to:

receive at least one request to hyphenate of an input word occurring in the human language;

determine the human language in the context of the at least one request;

evaluate how to process the at least one request based at least in part on the human language;

search for at least one hyphenation pattern occurring in the input word, wherein a substring of at least one hyphenation pattern is stored in the language-specific lexicon file; and respond to the at least one request, the response at least indicates based in part by determining whether the substring of the at least one hyphenation pattern occurred in the input word, wherein the at least one server may achieve complete accuracy in hyphenating input words that occur within the training data, and wherein the at least one server may achieve at least a lower bound on accuracy in hyphenating input words that do not occur in the training data, wherein the lower bound is based on a precision applicable to generating the hyphenation patterns; and at least one client system adapted to send the request and to receive the response thereto.

19. The word hyphenation system of claim 18, further comprising at least a further lexicon file that is specific to a least a further human language, and wherein the server is adapted to:

receive further training data that includes a further plurality of hyphenated words in the further human language;

inductively generate further hyphenation patterns that represent substrings occurring within the words, wherein the further hyphenation patterns include at least the substrings and hyphenation codes associated respectively with characters occurring in the substrings;

receive at least one induction parameter applicable to generating the further hyphenation patterns;

store at least the substrings and the hyphenation codes into the further lexicon file;

receive at least one further request to hyphenate one further input word occurring in the further human language;

evaluate how to process the further request based at least in part on the further human language;

search for the substring of the a least one further hyphenation pattern occurring in the further input word, wherein at least the further hyphenation pattern is stored in the further lexicon file; and respond to the further request, wherein the further response at least indicates whether the at least one further hyphenation pattern occurred in the further input word.

\* \* \* \* \*